United States Patent
Choudhari et al.

(10) Patent No.: US 11,151,088 B2
(45) Date of Patent: Oct. 19, 2021

(54) SYSTEMS AND METHODS FOR VERIFYING PERFORMANCE OF A MODIFICATION REQUEST IN A DATABASE SYSTEM

(71) Applicant: salesforce.com, inc., San Francisco, CA (US)

(72) Inventors: Mugdha Choudhari, San Carlos, CA (US); Anjani Gupta, Redwood City, CA (US); Birva Joshi, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 207 days.

(21) Appl. No.: 16/530,036

(22) Filed: Aug. 2, 2019

(65) Prior Publication Data

US 2021/0034574 A1    Feb. 4, 2021

(51) Int. Cl.
*G06F 16/00* (2019.01)
*G06F 16/17* (2019.01)
*G06F 16/16* (2019.01)
*G06F 16/9532* (2019.01)

(52) U.S. Cl.
CPC ........ *G06F 16/1734* (2019.01); *G06F 16/162* (2019.01); *G06F 16/9532* (2019.01)

(58) Field of Classification Search
CPC . G06F 16/1734; G06F 16/9532; G06F 16/162
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

*Primary Examiner* — Hung Q Pham
(74) *Attorney, Agent, or Firm* — LKGlobal | Lorenz & Kopf, LLP (57) ABSTRACT

Provided are systems and methods for verifying, in a database system, that a modification request to events data is completed. The method marks a modification request as verifying and implements a search strategy to search for unmodified events data (the stragglers) in the least expensive query scope first and then keep expanding the scope of the query until at least one unmodified events data is found (a straggler), which is marked as a fail. This strategy includes (i) beginning at a lowest scope search, (ii) searching a (database first: continuing to expand the search scope as high as it can go without a fail, and (iii) only when it's finished searching the database without a fail, searching a search engine in the same way. When the searches are done, and no fails have been marked, the method marks the request as done.

20 Claims, 3 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2019/0213171 A1* | 7/2019 | Long .................. G06F 21/62 |

* cited by examiner

SYSTEMS AND METHODS FOR VERIFYING PERFORMANCE OF A MODIFICATION REQUEST IN A DATABASE SYSTEM

TECHNICAL FIELD

Embodiments of the subject matter described herein relate generally to data processing systems and processes that use a common network-based platform to support applications executing on behalf of multiple users. More particularly, embodiments of the subject matter described herein relate to verifying completion of a modification request in a database system.

BACKGROUND

A database system can store, manipulate, and organize event's data for businesses, organizations, individuals, and various other tenants. In a non-limiting example, events' data can include crawl data, email data, meetings data, tasks data, and telephone call data. Various operations, for example, queries, such as a SalesforceIQ (SIQ), performed by the multi-tenant search engine may store user events' data in distributed data storage and in a search engine. Occasionally, a business, company, individual, or entity using the database system might request various modifications to stored events data, such as, deletion of some or all events data associated with a person, organization, or entity; deletion and modification systems are directed to this need.

However, for several reasons, modifications, such as deletion requests, can be difficult to completely perform. First, some deletion systems process user-initiated deletion requests and perform the requested delete on a search system or on a distributed data storage, based on a scope of the deletion request. The different types of user-initiated deletion requests may vary scope, and the amount of data to be deleted can vary accordingly. Also, as may be appreciated, a deletion request is generally asynchronous, therefore, validating the results of the deletion corresponding to the deletion request right after the deletion request was proffered can be difficult to do. Each of these issues can lead to stragglers, or an incompletely performed deletion.

Accordingly, there is a need for enhancing deletion systems by providing systems and methods for verifying that a deletion request in a database system has been completely performed without any errors.

SUMMARY

Some embodiments of the present disclosure provide a verification system that verifies performance of a modification request. These embodiments include: a database including a first plurality of events data; a Search Engine (SE) including a second plurality of events data; a modification system with access to the database and the SE, the modification system generates a verification message that indicates modified events data in at least one of the first plurality of events data and the second plurality of events data; and a verification processor to receive the verification message and respond by: marking the modification request as verifying; assigning an initial scope level SLi to the modification request, from among N scope levels SL of increasing size from 1 to N; performing a search of the database, the search including: (i) initializing SL=SLi; (ii) performing an event count query on the DDS using SL to thereby generate a database event count; (iii) marking the modification request as failed, when the database event count is greater than zero; (iv) incrementing SL when the modification request is not marked failed; and (v) repeating (ii)-(iv) when the modification request is not marked failed, until S=N, thereby completing the search of the database; performing a SE search upon the co-occurrence of: the search of the database is completed, and the modification request is not marked failed, the SE search including: (a) initializing SL=SLi; (b) performing an event count query on the SE using SL to thereby generate a SE event count; (c) marking the modification request as failed, when the SE event count is greater than zero; (d) incrementing SL when the modification request is not marked failed; and (e) repeating (b)-(d) until SL=N, thereby completing the SE search; and marking the modification request as done upon the co-occurrence of: the SE search is completed, and the modification request is not marked failed.

Some embodiments provide a processor-implemented method for verifying performance of a modification request, including: receiving, from a modification system, a verification message that indicates modified events data in association with a modification request, the events data being in at least one of a database and a Search Engine (SE); receiving, from a modification system, a verification message that indicates modified events data in association with a modification request, the events data being in at least one of a database and a Search Engine (SE); receiving, from a modification system, a verification message that indicates modified events data in association with a modification request, the events data being in at least one of a database and a Search Engine (SE); marking the modification request as verifying; assigning an initial scope level SLi to the modification request, from among N scope levels SL of increasing size from 1 to N; performing a database search, including: (i) initializing SL=SLi; (ii) performing an event count query on the database using SL to thereby generate a database event count; (iii) marking the modification request as failed, when the database event count is greater than zero; (iv) incrementing SL when the modification request is not marked failed; and (v) repeating (ii)-(iv) when the modification request is not marked failed, until SL=N, thereby completing the database search; performing a SE search upon the co-occurrence of: the database search is completed, and the modification request is not marked failed, the SE search including: (a) initializing SL=SLi; (b) performing an event count query on the SE using SL to thereby generate a SE event count; (c) marking the modification request as failed, when the SE event count is greater than zero; (d) incrementing SL when the modification request is not marked failed; and (e) repeating (b)-(d) until SL=N, thereby completing the SE search; and marking the modification request as done upon the co-occurrence of: the SE search is completed, and the modification request is not marked failed.

Some embodiments provide a non-transitory computer-readable medium containing instructions thereon, which, when executed by a processor, are capable of performing a method including: receiving, from a modification system, a verification message that indicates that it has modified events data in association with a modification request, the events data being in at least one of a database, and a Search Engine (SE); marking the modification request as verifying; assigning an initial scope level SLi to the modification request, from among N scope levels SL of increasing size from 1 to N; performing a search of the database, including: (i) initializing SL=SLi; (ii) performing an event count query on the database using SL to thereby generate a database event count; (iii) marking the modification request as failed, when the database event count is greater than zero; (iv) incrementing SL when the modification request is not marked failed; and (v) repeating (ii)-(iv) when the modification request is not marked failed, until SL=N, thereby completing the search of the database; performing a search of the SE upon the co-occurrence of: the database search is completed, and the modification request is not marked failed, the search including: (a) initializing SL=SLi; (b) performing an event count query on the SE using SL to thereby generate a SE event count; (c) marking the modification request as failed, when the SE event count is greater than zero; (d) incrementing SL when the modification request is not marked failed; and (e) repeating (b)-(d) until SL=N, thereby completing the search of the SE; and marking the modification request as done upon the co-occurrence of: the SE search is completed, and the modification request is not marked failed.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The exemplary embodiments presented herein generally relate to systems and methods for verifying that a deletion responsive to a deletion request, or other modification responsive to a modification request, has been completely performed. As a functional result, the database is cleaned up and deletion system performance and overall system performance, are enhanced. Also, as a functional result, marking the modification request as done or as failed, utilizing the search strategy described hereinbelow, improves the performance of the data processing system. Exemplary embodiments may be implemented within a variety of database configurations, including but not limited to, multi-tenant database systems and multi-tenant application systems.

Figure 1:
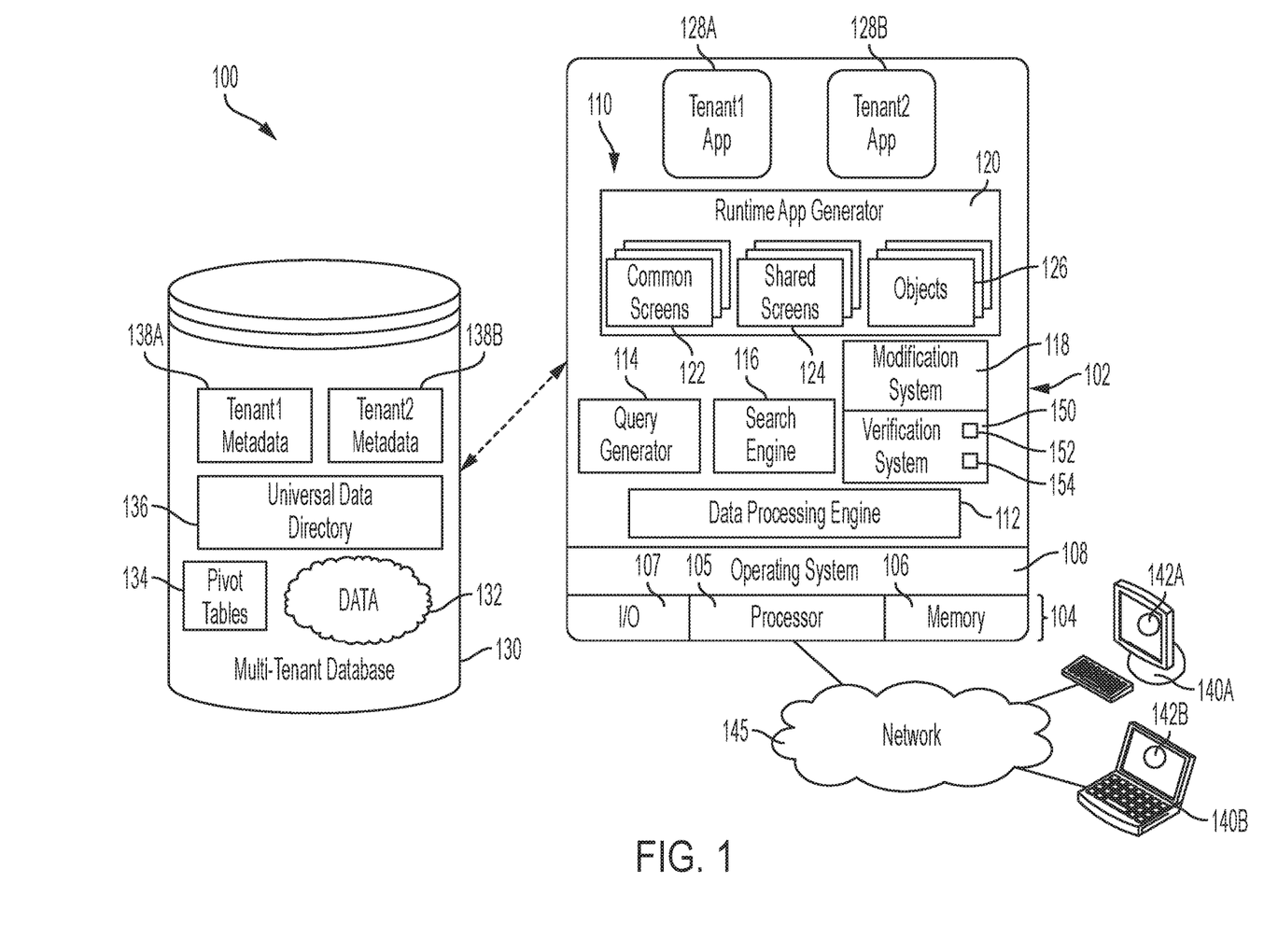
FIG. 1 is a block diagram of an exemplary database processing system in which embodiments of the verification system may be employed.

Turning now to FIG. 1, an exemplary multi-tenant application system 100 useful in describing various embodiments generally includes a server 102 that dynamically creates virtual applications 128 (128A, 128B) based upon data 132 from a common database 130 that may be a distributed data storage (DDS) that is shared between multiple tenants. Data and services generated by the virtual applications 128 are provided via a network 145 to any number of client devices 140 (140A, 140B), as desired. Each virtual application 128 is suitably generated at run-time using a common application platform 110 that securely provides access to the data 132 in the database 130 for each of the various tenants subscribing to the system 100. In accordance with one non-limiting example, the system 100 may be implemented in the form of a multi-tenant CRM system that can support any number of authenticated users of multiple tenants.

A "tenant" generally refers to a group of users that shares access to common data within the database 130. Tenants may represent customers, customer departments, business or legal organizations, and/or any other entities that maintain data for particular sets of users within the system 100. Although multiple tenants may share access to the server 102 and the database 130, the particular data and services provided from the server 102 to each tenant can be securely isolated from those provided to other tenants. The multi-tenant architecture therefore allows different sets of users to share functionality without necessarily sharing any of the data 132.

The database 130 is any sort of repository or other data storage system capable of storing and managing the data 132 associated with any number of tenants (hence, may be alternately referred to as a distributed data storage, DDS). The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

The data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired.

Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 (138A, 138B) for each tenant, as desired. Rather than forcing the data 132 into an inflexible global structure that is common to all tenants and applications, the distributed data storage, database 130, is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. The server 102 operates with any sort of conventional processing hardware 104, such as a processor 105, memory 106, input/output features 107 and the like. The processor 105 may be implemented using one or more microprocessors, microcontrollers, processing cores and/or other computing resources spread across any number of distributed or integrated systems, including any number of "cloud-based" or other virtual systems. The memory 106 represents any non-transitory short- or long-term storage or other computer-readable media capable of storing computer-executable programming instructions for execution on the processor 105, including any sort of random-access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or application platform, e.g., a portable hard drive, a USB flash drive, an optical disc, or the like. The input/output features 107 represent conventional interfaces to networks (e.g., to the network 145, or any other local area, wide area or other network), mass storage, display devices, data entry devices and/or the like. In a typical embodiment, the application platform 110 gains access to processing resources, communications interfaces and other features of the processing hardware 104 using any sort of conventional or proprietary operating system 108. As noted above, the server 102 may be implemented using a cluster of actual and/or virtual servers operating in conjunction with each other, typically in association with conventional network communications, cluster management, load balancing and other features as appropriate.

The application platform 110 is any sort of software application or other data processing engine that generates the virtual applications 128 that provide data and/or services to the client devices 140. The virtual applications 128 are typically generated at run-time in response to queries received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process, controller module, or other hardware or software module, and many equivalent embodiments could include different and/or additional features, components or other modules as desired.

The runtime application generator 120 dynamically builds and executes the virtual applications 128 in response to specific requests received from the client devices 140. The virtual applications 128 created by tenants are typically constructed in accordance with the tenant-specific metadata 138, which describes the particular tables, reports, interfaces and/or other features of the particular application. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed. In a typical embodiment, the query generator 114 receives a synchronous intelligent query (SIQ), considers the identity of the user making the particular query, and then builds and executes queries to the database 130 using system-wide metadata 136, tenant specific metadata 138, pivot tables 134, and/or any other available resources. As used herein, the queries may be a request of some sort, such as a data deletion request, a data addition request, or a data update/change request. The query generator 114 in this example therefore maintains security of the common database 130 by ensuring that queries are consistent with access privileges granted to the user that initiated the query/request.

The data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

Although shown separately for the purpose of the following description, the Modification System 118 and the Verification System 150 each may be integrated within the data processing engine 112. As used herein, the modification system 118 is directed to a modification, such as a deletion, an addition, or an update to an item of events data, as described below. For example, in an exemplary embodiment below, the modification system 118 is a deletion system. However, in various other embodiments, the modification system 118 includes an update system and/or an addition system.

As mentioned, verification system 150 is shown as a separate functional block to describe its operation, however, in various embodiments, the verification system 150 may also integrated within the data processing engine 112. The verification system 150 receives a verification message from the modification system and performs an expanding scope comprehensive check for unmodified events (stragglers) in the common database 130 and in the search engine 116, and then marks the request as either done (i.e., completely performed without stragglers) or failed.

The verification system 150 may be implemented in a variety of combinations of hardware and/or software, including as a program product. In FIG. 1, the verification system 150 is shown implemented with a verification processor 152 and data storage, memory 154. The memory 154 is understood to comprise the instructions, programming, and/or algorithm that, when executed by a processing architecture, direct operations of the verification system 150, as described herein. In various embodiments, the verification processor 152 and memory 154 are integrated, and the verification processor 152 is said to be programmed. During operation, the verification processor 152 loads and executes the program in memory 154. The operation of the verification system 150 is described in more detail in connection with FIGS. 2 and 3.

In operation, developers use the application platform 110 to create data-driven virtual applications 128 for the tenants that they support. Such virtual applications 128 may make use of interface features such as tenant-specific screens 124, universal screens 122 or the like. Any number of tenant-specific and/or universal objects 126 may also be available for integration into tenant-developed virtual applications 128. The data 132 associated with each virtual application 128 is provided to the database 130, as appropriate, and stored until it is requested or is otherwise needed, along with the metadata 138 that describes the particular features (e.g., reports, tables, functions, etc.) of that particular tenant-specific virtual application 128.

The data and services provided by the server 102 can be retrieved using any sort of personal computer, mobile telephone, tablet or other network-enabled client device 140 on the network 145. Typically, the user operates a conventional browser or other client program 142 to contact the server 102 via the network 145 using, for example, the hypertext transfer protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. The query generator 114 suitably obtains the requested data 132 from the database 130 as needed to populate the tables, reports or other features of the particular virtual application 128. In this regard, each tenant will typically be assigned or more associated "organization IDs" corresponding to a field in database 130, thereby identifying the data to which the user (and corresponding organizations) has access. As noted above, the virtual application 128 may contain Java, ActiveX, or other content and code that can be presented using conventional client software running on the client device 140; other embodiments may simply provide dynamic web or other content that can be presented and viewed by the user, as desired.

Figure 2:
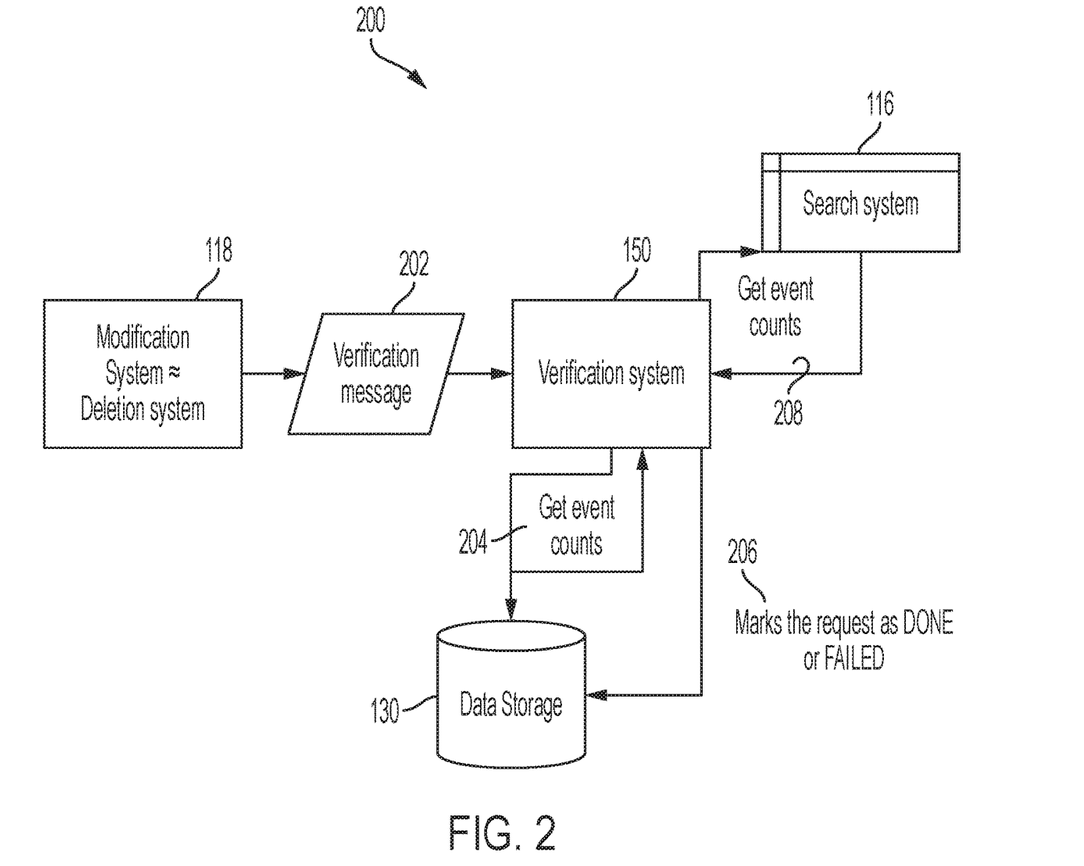
FIG. 2 is a verification data flow diagram in which the modification system is a deletion system.
Figure 3:
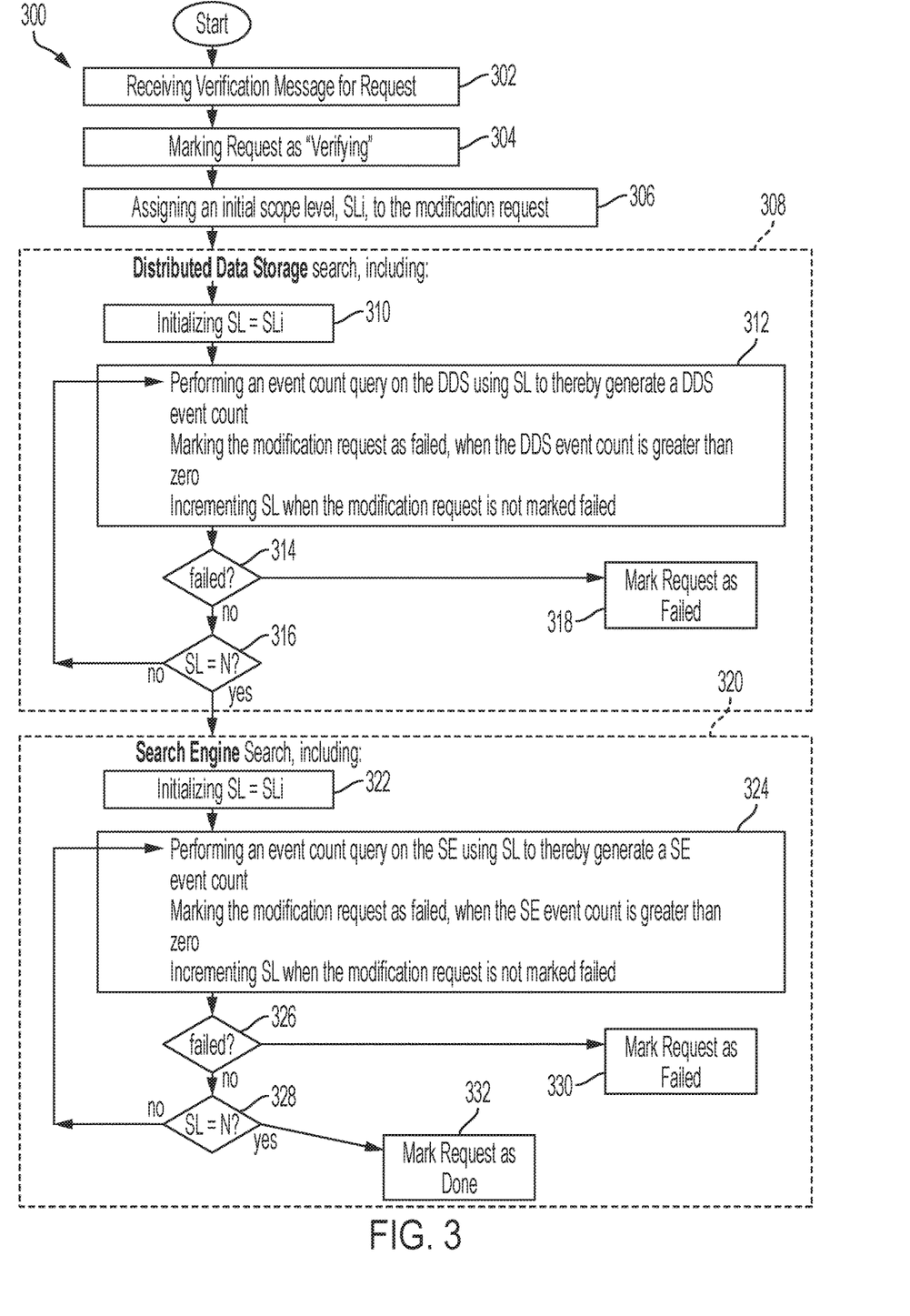
FIG. 3 depicts operational steps of an exemplary method for verifying performance of a modification request.

Having thus given an overview of a multi-tenant application system 100 in which the verification system 150 may operate, an exemplary method for verifying performance of a modification request will now be described in conjunction with the diagrams illustrated in FIG. 2 and FIG. 3. FIG. 2 is a verification data flow diagram in which the modification system 118 is a deletion system. FIG. 3 depicts operational steps of an exemplary method 300 for verifying performance of a modification request.

In an embodiment described below, the data of interest is events data. Events data includes crawl data, email data, meetings data, tasks data, telephone call data, conference call data, and the like. As mentioned, as a result of various operations, events data can be found in the distributed data storage (database 130) and the Search Engine (SE 116). In an example, the database 130 includes a first plurality of events data, and the SE 116 includes a second plurality of events data.

A person, entity, or bot who wants to make a modification to events data makes a modification request via the modification system 118. For the purpose of the description, the person who makes a modification request is referred to as an administrator and may have first successfully navigated a security protocol to obtain the privilege of performing the modification.

In an example, the administrator may want to delete all tasks associated with a user. In another example, the administrator may want to delete all instances of a user, i.e., all emails, meetings, tasks, telephone calls, conference calls, and the like, which have the user identification attached. In yet another example, the administrator may want to update all meetings attached to an organization.

The modification system 118 has access to the database 130 and the SE 116. The modification system 118 generates a verification message that indicates that it has modified events data in at least one of the first plurality of events data and the second plurality of events data. For this example, the modification system 118 receives a modification request from an authorized user prior to making the modification, and the modification is specifically in response to the modification request. In an exemplary embodiment, the modification request is a deletion request, for deletion of events data, and the verification message for the deletion request relays to the verification system 150 that the deletion has occurred.

The verification processor 152 executes computer-readable program instructions to receive the verification message (at 302) and responds to it by: marking the modification request as verifying (at 304), then beginning its search for stragglers. As an overview, the search strategy implemented by the verification system 150 is to search for unmodified events data (the stragglers) in the least expensive query scope first and then keep expanding the scope of the query until at least one unmodified events data is found (a straggler), which indicates that the modification request was not done completely and is marked as a fail. This strategy encourages a fast fail to save time and CPU cycles. Implementing this strategy includes (i) beginning at a lowest scope search, (ii) searching the database 130: continuing to expand the scope in the database 130 until the scope is expanded as high as it can go without a fail, and (iii) only when it's finished searching the database 130 without a fail does it move to the search engine 116, and again starts at the lowest scope level and expands upward in scope level until the scope is expanded as high as it can go without a fail. Only when no fails have been marked and the database 130 and the SE 116 are searched, does the verification system 150 mark the request as done (at 332). These steps are described in more detail below.

The verification system 150 assigns an initial scope level SLi to the modification request (at 306). The initial scope level, SLi, is assigned from among N scope levels SL of increasing size from 1 to N. In embodiments in which the scope levels are not inherently numerical, the verification processor assigns SL levels by employing a predefined transformation to assign names or labels to steps on a scale of SL levels of increasing size from 1 to N. In an example, a user and an organization are used for the search, therefore, the N=2. The verification processor 150 assigns SLi to be the user, assigned SLi=1, and assigns the organization to be the next scope level, assigned SL=2. In this example, the request is to delete events data related to the user, so the verification system 150 searches the database 130 for user events data associated with the user, then expands SL by one scope level to search the database 130 for organizational events data related to the user.

Each of the searches (308 and 320) begins by setting a scope level SL to the lowest scope level related to the modification request, and then begin a search (searches may be referred to alternately as queries). The searches look for any events data, and if any events data is found, the count of events data is greater than zero, and the requested modification is marked as a fail. In other words, the specific count of events data is not relevant to this search, this feature enhances the speed and reduces the cycle time necessary for finding a fail.

Accordingly, at 310, scope level SL is set to SLi. The database search (at 308) includes: (i) initializing SL=SLi at 310 and then beginning a database search loop (at 312) including (ii) performing an event count query on the database 130 using SL to thereby generate a database event count 204; (iii) marking the modification request as failed (206, at 318), when the database event count 204 is greater than zero; and (iv) incrementing SL when the modification request is not marked failed (at 314). The loop at 312 is repeated when the modification request is not marked failed (at 314), until SL=N (at 316), thereby completing the database search. As used herein, "marking the modification request" refers to updating a job queue.

Only upon not finding a fail in the database search, does the verification system 150 perform a SE search (at 320). In other words, the SE search is performed upon the co-occurrence of: the database search (at 308) is completed and the modification request is not marked failed. As before, the SE search includes: (a) initializing SL=SLi (at 322) and then beginning a SE search loop (at 324), including (b) performing an event count query on the SE 116 using SL to thereby generate a SE event count 208; (c) marking the modification request as failed 330, when the SE event count 208 is greater than zero; (d) incrementing SL when the modification request is not marked failed; and (e) repeating the SE loop 324 until SL=N, thereby completing the SE search. Upon completing the SE search, if the modification request has not been marked failed, the method 300 marks the modification request as done (at 332) (i.e., completely performed, no stragglers). In other words, the modification request is marked done (at 332) upon the co-occurrence of: the SE search is completed, and the modification request is not marked failed.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Thus, although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a tangible processor-readable medium, which may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A verification system that verifies performance of a modification request, comprising:
    a database including a first plurality of events data;
    a Search Engine (SE) including a second plurality of events data;
    a modification system with access to the database and the SE, the modification system generates a verification message that indicates modified events data in at least one of the first plurality of events data and the second plurality of events data; and
    a verification processor to receive the verification message and respond by:
    marking the modification request as verifying;
    assigning an initial scope level SLi to the modification request, from among N scope levels SL of increasing size from 1 to N;
    performing a search of the database, the search including:
        (i) initializing SL=SLi;
        (ii) performing an event count query on the database using SL to thereby generate a database event count;
        (iii) marking the modification request as failed, when the database event count is greater than zero;
        (iv) incrementing SL when the modification request is not marked failed; and
        (v) repeating (ii)-(iv) when the modification request is not marked failed, until SL=N, thereby completing the search of the database;
    performing a SE search upon the completion of the search of the database, the SE search including:
        (a) initializing SL=SLi;
        (b) performing an event count query on the SE using SL to thereby generate a SE event count;
        (c) marking the modification request as failed, when the SE event count is greater than zero;
        (d) incrementing SL when the modification request is not marked failed; and
        (e) repeating (b)-(d) until SL=N, thereby completing the SE search; and
    marking the modification request as done upon the completion of the SE search.

2. The verification system of claim 1, wherein the modification system is a deletion system and the modification request is a deletion request.

3. The verification system of claim 1, wherein the modification system is an update system and the modification request is an update request.

4. The verification system of claim 1, wherein the verification processor is further programmed to mark the modification request by updating a job queue.

5. The verification system of claim 1, wherein the verification processor is farther to assign SL levels by employing a redefined transformation to assign names or labels into the SL levels.

6. The verification system of claim 5, wherein the verification processor is further to assign the initial scope level SLi to 1 to represent a user, and wherein N=2.

7. The verification system of claim 6, wherein the verification processor is further to assign the second scope level SLi to 2 to represent an organization.

8. A processor-implemented method for verifying performance of a modification request, comprising:
- receiving, from a modification system, a verification message that indicates modified events data in association with a modification request, the events data being in at least one of a database and a Search Engine (SE);
- marking the modification request as verifying;
- assigning an initial scope level SLi to the modification request, from among N scope levels SL of increasing size from 1 to N;
- performing a database search, including:
  - (i) initializing SL=SLi;
  - (ii) performing an event count query on the database using SL to thereby generate a database event count;
  - (iii) marking the modification request as failed, when the database event count is greater than zero;
  - (iv) incrementing SL when the modification request is not marked failed; and
  - (v) repeating (ii)-(iv) when the modification request is not marked failed, until SL=N, thereby completing the database search;
- performing a SE search upon the completion of the database search, the SE search including:
  - (a) initializing SL=SLi;
  - (b) performing an event count query on the SE using SL to thereby generate a SE event count;
  - (c) marking the modification request as failed, when the SE event count is greater than zero;
  - (d) incrementing SL when the modification request is not marked failed; and
  - (e) repeating (b)-(d) until SL=N, thereby completing the SE search; and
- marking the modification request as done upon the completion of the SE search.

9. The method of claim 8, wherein the modification system is a deletion system and the modification request is a deletion request.

10. The method of claim 9, wherein marking the modification request comprises updating a job queue.

11. The method of claim 10, further comprising assigning SL levels by employing a predefined transformation to assign names or labels into the SL levels.

12. The method of claim 11, wherein N=2.

13. The method of claim 12, further comprising assigning the initial scope level SLi to 1 to represent a user.

14. The method of claim 13, further comprising assigning the second scope level SLi to 2 to represent an organization.

15. The method of claim 14, wherein events data includes crawl data, email data, meetings data, tasks data, and telephone call data.

16. The method of claim 8, wherein the modification system is an update system and the modification request is an update request.

17. A non-transitory computer-readable medium containing instructions thereon, which, when executed by a processor, are capable of performing a method comprising:
- receiving, from a modification system, a verification message that indicates that it has modified events data in association with a modification request, the events data being in at least one of a database, and a Search Engine (SE);
- marking the modification request as verifying;
- assigning an initial scope level SLi to the modification request, from among N scope levels SL of increasing size from 1 to N;
- performing a search of the database, including:
  - (i) initializing SL=SLi;
  - (ii) performing an event count query on the database using SL to thereby generate a database event count;
  - (iii) marking the modification request as failed, when the database event count is greater than zero;
  - (iv) incrementing SL when the modification request is not marked failed; and
  - (v) repeating (ii)-(iv) when the modification request is not marked failed, until SL=N, thereby completing the search of the database;
- performing a search of the SE upon the completion of the database search, the search including:
  - (a) initializing SL=SLi;
  - (b) performing an event count query on the SE using SL to thereby generate a SE event count;
  - (c) marking the modification request as failed, when the SE event count is greater than zero;
  - (d) incrementing SL when the modification request is not marked failed; and
  - (e) repeating (b)-(d) until SL=N, thereby completing the search of the SE; and
- marking the modification request as done upon the completion of the SE search.

18. The non-transitory computer-readable medium of claim 17, wherein marking the modification request comprises updating a job queue.

19. The non-transitory computer-readable medium of claim 18, wherein the method further comprises assigning SL levels by employing a predefined transformation to assign names or labels into the SL levels.

20. The non-transitory computer-readable medium of claim 18, wherein the method further assigns SLi=1 to a user, and assigns SL=2 to an organization.

* * * * *

UNITED STATES PATENT AND TRADEMARK OFFICE
CERTIFICATE OF CORRECTION

PATENT NO. : 11,151,088 B2  
APPLICATION NO. : 16/530036  
DATED : October 19, 2021  
INVENTOR(S) : Mugdha Choudhari, Anjani Gupta and Birva Joshi Page 1 of 1

It is certified that error appears in the above-identified patent and that said Letters Patent is hereby corrected as shown below:

In the Claims

Column 10, Line 61, cancel the text beginning with "5. The verification system" to and ending "organization." in Column 11, Line 3, and insert the following three claims:
--5. The verification system of claim 1, wherein the verification processor is further programmed to assign SL levels by employing a predefined transformation to assign names or labels into the SL levels.
6. The verification system of claim 5, wherein the verification processor is further programmed to assign the initial scope level SLi to 1 to represent a user, and wherein N = 2.
7. The verification system of claim 6, wherein the verification processor is further programmed to assign the second scope level SLi to 2 to represent an organization.--

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*